United States Patent
Srivastav et al.

(10) Patent No.: US 10,311,740 B2
(45) Date of Patent: Jun. 4, 2019

(54) AGGREGATION AND DISTRIBUTION OF REAL-TIME DATA

(71) Applicant: Honeywell International Inc., Morris Plains, NJ (US)

(72) Inventors: Amit Srivastav, Bangalore (IN); Krishna Idupunur, Hyderabad (IN); Sibu Parakkattu Narayanan, Bangalore (IN); Anantha Chandrasekhar Koduru, Secunderabad (IN); Shafi Merchant, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/194,263

(22) Filed: Jun. 27, 2016

(65) Prior Publication Data

US 2017/0372623 A1    Dec. 28, 2017

(51) Int. Cl.
  *G08G 5/00*     (2006.01)
  *G06Q 30/02*    (2012.01)
  (Continued)

(52) U.S. Cl.
  CPC .......... *G08G 5/0091* (2013.01); *G01S 13/953* (2013.01); *G06Q 30/0283* (2013.01);
  (Continued)

(58) Field of Classification Search
  CPC .. G08G 5/0091; G08G 5/0013; G08G 5/0021; G06Q 30/0283
  (Continued)

(56) References Cited

U.S. PATENT DOCUMENTS

| 5,583,972 A | 12/1996 | Miller |
| 8,314,730 B1 | 11/2012 | Musiak et al. |

(Continued)

FOREIGN PATENT DOCUMENTS

| CN | 102916844 | 2/2013 |
| EP | 2575120 | 4/2013 |

OTHER PUBLICATIONS

Gonalo De Grado, "On the Development of a Digital Meteorological Model for Simulating (Future Air Traffic Management Automation", 2011 20th IEEE International Workshops on Enabling Technologies: Infrastructure for Collaborative Enterprises, 2011, pp. 223-228, Publisher: IEEE.

(Continued)

*Primary Examiner* — Anne M Antonucci
*Assistant Examiner* — James E Stroud
(74) *Attorney, Agent, or Firm* — Bookoff McAndrews, PLLC

(57) ABSTRACT

A system for data aggregation and distribution comprises a context builder that receives a data request from a consumer, and a producers locator that communicates with producers. A producers filter receives a list of producers and selects producers capable of providing data relevant to context information. A data requests formatter receives the context information, and sends the data request to the selected producers. A data responses validator validates data responses from producers, and a data responses processor processes validated data responses. A data predictor receives processed data responses and context information, and generates data prediction information. A data fusion module receives processed data responses, context information, data prediction information, and data history. The data fusion module combines processed data responses with data prediction information to generate a consolidated data response (Continued)

for the consumer. The data fusion module also considers data prediction information upon receiving a request for predicted data when real-time data is unavailable.

19 Claims, 13 Drawing Sheets

(51) Int. Cl.
    *G01S 13/95*     (2006.01)
    *G01W 1/02*     (2006.01)
    *G01W 1/00*     (2006.01)

(52) U.S. Cl.
    CPC ......... *G08G 5/0013* (2013.01); *G08G 5/0021* (2013.01); *G08G 5/0026* (2013.01); *G01W 1/02* (2013.01); *G01W 2001/006* (2013.01); *G01W 2203/00* (2013.01); *Y02A 90/14* (2018.01); *Y02A 90/18* (2018.01)

(58) Field of Classification Search
    USPC .......................................................... 701/14
    See application file for complete search history.

(56) References Cited

U.S. PATENT DOCUMENTS

| | | | |
|---|---|---|---|
| 8,332,084 | B1 | 12/2012 | Bailey et al. |
| 8,437,893 | B2 | 5/2013 | Mead et al. |
| 8,914,730 | B2 * | 12/2014 | Halperin ........... G06F 17/30873 709/225 |
| 9,567,099 | B2 * | 2/2017 | Poux ................... G08G 5/0021 |
| 2013/0070677 | A1 * | 3/2013 | Chang ................ G01S 13/9303 370/328 |
| 2014/0032034 | A1 * | 1/2014 | Raptopoulos ........ G08G 5/0069 701/25 |
| 2014/0136589 | A1 * | 5/2014 | Wahler .............. H04L 29/08144 709/201 |
| 2015/0304813 | A1 * | 10/2015 | Esposito ................ H04B 7/155 455/456.2 |
| 2015/0323932 | A1 * | 11/2015 | Paduano ................ G05D 1/042 701/3 |
| 2016/0011318 | A1 * | 1/2016 | Cohen ..................... G01S 19/05 342/357.26 |
| 2016/0152252 | A1 * | 6/2016 | Kim ....................... H02N 2/186 701/31.4 |

OTHER PUBLICATIONS

Klein et al., "Aircraft Access to Swim—A Collaborative ATM Pathfinder to Support a TBO Environment", 2015 Integrated Communications Navigation and Surveillance (ICNS) Conference, Apr. 21-23, 2015, pp. Q4-1-Q4-10, Published in: US.

Lucke et al., "Planet-2: Providing In-Flight Weather Services and Observations to and From Business and Regional Aircraft", 2013 Integrated Communications Navigation and Surveillance (ICNS) Conference, Apr. 23-25, 2015, pp. J4-1-J4-12, Published in: US.

European Patent Office, "Partial European Search Report for EP Application No. 17176738.7", from Foreign Counterpart to U.S. Appl. No. 15/194,263, dated Oct. 27, 2017, pp. 123, Published in: EP.

European Patent Office, "Extended European Search Report from EP Application No. 17176738.7 dated Jan. 29, 2018", from Foreign Counterpart of U.S. Appl. No. 15/194,263, filed Jan. 29, 2018, pp. 119, Published in: EP.

\* cited by examiner

AGGREGATION AND DISTRIBUTION OF REAL-TIME DATA

BACKGROUND

During flight, pilots rely on various onboard sensory data sources to make decisions for a continuous and safer flight, ensuring a better flying experience for passengers. Weather along the flight path, runway conditions, or other parameters, are dynamic in nature, and having knowledge of such parameters becomes essential for a safer and secure flight. Onboard sensory data is essential for pilots in making decisions so as to have a continuous and safe flight. For example, some aircraft are equipped with onboard weather radar to aid the pilot in understanding the weather conditions prevailing along a flight path. This helps the pilot to make critical decisions in altering the course of flight to avoid bad weather prevailing along the flight path.

State of the art onboard weather radars are capable of detecting weather only up to about 320 nautical miles (nmi). There are some aircrafts that fly without any onboard weather radar. Attributing to these deficiencies, pilots may at times fly through areas where bad weather prevails (e.g., turbulence zones). In other scenarios, when a pilot lands an aircraft on a wet runway, the aircraft can experience slipping and skidding. Some of these instances can lead to either passenger discomfort, or may even cause severe damage to both passengers as well as the structure of the aircraft.

Accordingly, it would be useful from an information perspective, to provide any trailing aircraft, or other aircraft that would potentially be flying into the same area, with weather or other data in advance.

While not of a safety-critical nature, ensuring in-flight connectivity is another parameter that would enable a better passenger flight experience. For example, it would be useful to have flight paths defined in such a way that in-flight connectivity can be guaranteed through the course of flight.

SUMMARY

A system and method for data aggregation and distribution is provided. The system comprises a context builder module configured to receive a validated and processed data request from a consumer, with the context builder module configured to generate context information for the data request from the consumer. A producers locator module is configured to receive the context information from the context builder module and is in operative communication with one or more producers. The producers locator module is configured to spatially resolve and generate a list of the producers from which data can be requested. A producers filter module is configured to receive the list of the producers from the producers locator module, with the producers filter module configured to select one or more of the producers that are capable of providing data relevant to the context information for the data request. A data requests formatter module is configured to receive the context information from the context builder module and a list of selected producers from the producers filter module, with the data requests formatter configured to send the data request to the selected producers. A data responses validator module is configured to receive and validate data responses from the selected producers, and a data responses processor is configured to receive and process the validated data responses from the data responses validator module. A data predictor module is configured to receive the validated and processed data responses from the data responses processor and to receive the context information from the context builder module, with the data predictor module configured to generate data prediction information based on accumulated preserved data gathered for one or more prior data requests. A data fusion module is configured to receive the validated and processed data responses from the data responses processor, the context information from the context builder module, the data prediction information from the data predictor module, and data from a data history and analytics repository. The data fusion module is operative to combine the validated and processed data responses from the producers with the data prediction information to generate a consolidated data response for the consumer. The data fusion module also considers the data prediction information upon receiving a request for predicted data from the consumer when real-time data is not available from the producers.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for aggregation and distribution of real-time data, such as aeronautical data, are described herein. In general, the present system includes data consumers and data producers that operatively communicate with a ground center, such as through one or more in-flight or on-ground communication channels. The data consumers can be pilots of consumer aircrafts, for example, which send requests to the ground center seeking available real-time aeronautical data. The data producers can be data producer aircrafts capable of providing real time aeronautical data, such as from various onboard sensors.

The system provides a transaction platform where flight information, such as real-time weather conditions, runway conditions, and the like, are exchanged between producer aircraft and consumer aircraft via the ground center, which provides for data aggregation and distribution to generate unified data. The transaction platform provides for handling multiple data producers such that unified data gets defined by applying data fusion techniques at the ground center. The transaction platform is also capable of quantifying transactions and monetizing the services offered to the data consumers.

In some implementations, the system can have both registered data producer aircraft and registered data consumer aircraft. The consumer aircraft transmits a data request to a ground center, which analyzes the request and sends the request to one or more producer aircrafts. For example, in the case of a weather data request from a consumer aircraft, the ground center sends a request for weather data to producer aircrafts that are in the correct area with the right heading. The weather data from the producer aircrafts is sent to the ground center, fused with other relevant data, and then transmitted to consumer aircraft.

Further details of the present system and method are described hereafter with reference to the drawings.

Figure 1:
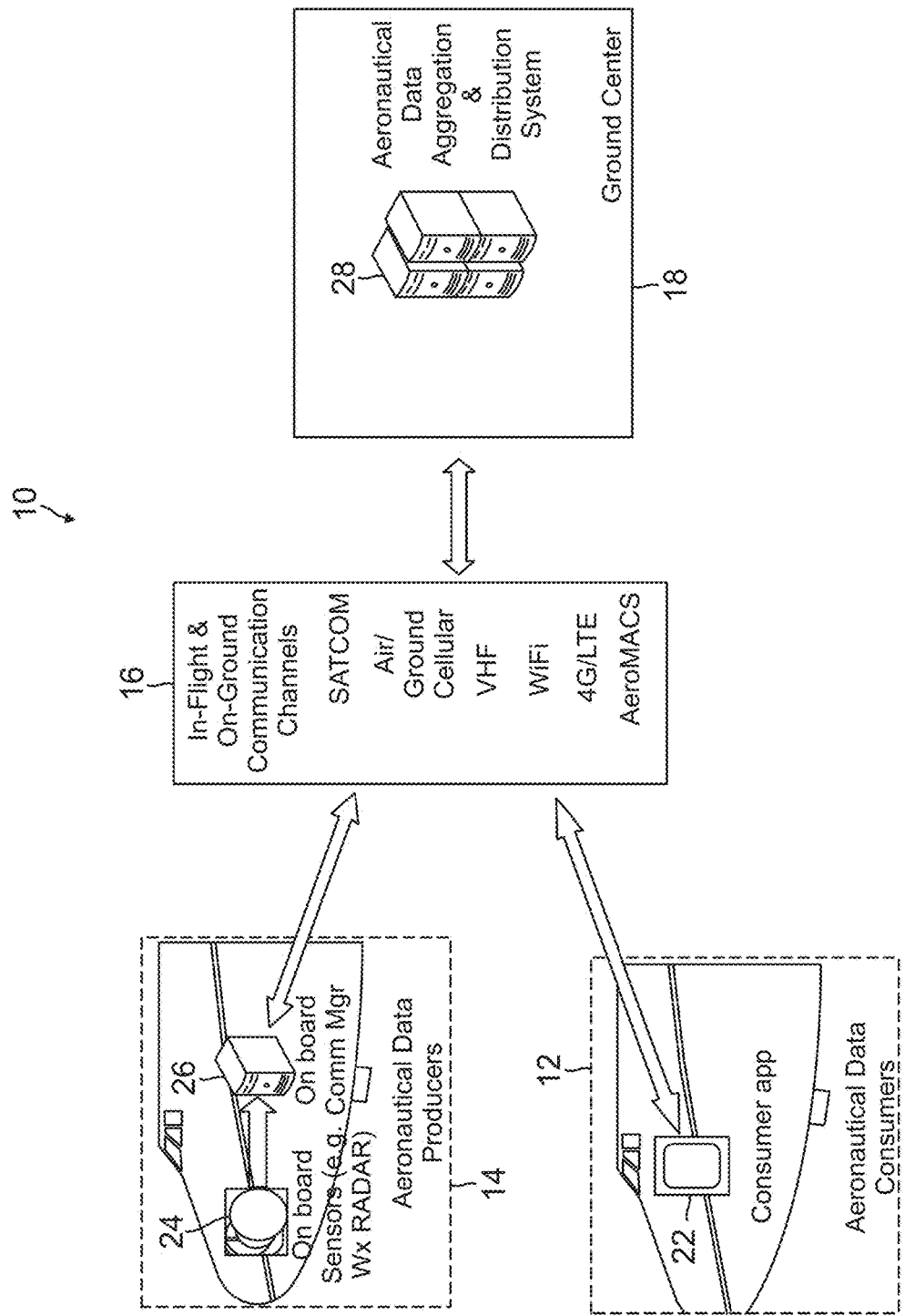
FIG. 1 is a block diagram of a network for aeronautical data aggregation and distribution, according to one embodiment.

FIG. 1 is a block diagram of an aviation network 10 for aeronautical data aggregation and distribution, according to one embodiment. The aviation network 10 generally includes one or more aeronautical data consumers 12, and one or more aeronautical data producers 14, which communicate through one or more in-flight and on-ground communication channels 16 with a ground center 18.

The aeronautical data consumer 12 includes consumer aircraft, in which a pilot sends a request to ground center 18 seeking available real time aeronautical data, such as weather conditions along a flight path, runway conditions of a particular airport, or the like. The pilot of the consumer aircraft can then leverage the real time aeronautical data to aid in safer flying of the aircraft.

In one embodiment, data consumers 12 can be registered users of network 10, which provides a transaction platform for the consumer aircrafts. In one implementation, the transaction platform can provide a mobile consumer application (app) 22 (or a distributed service such as a web service) that can be accessed by the pilot using an electronic device, such as an electronic flight bag (EFB), tablet, or any other hand held electronic device, to send a request to ground center 18 through communication channel 16 seeking real time aeronautical data. In one implementation, such a request can be communicated using predefined tags, such as "Request Weather" or "Request Runway Conditions" and the like. There can also be tags for requesting complete weather information across the flight plan of the consumer aircraft. While there may not be any restrictions on the communication channel, using the lowest cost available network is a priority, in case multiple communication channels are available.

The aeronautical data producers 14 include producer aircrafts capable of providing real time aeronautical data, such as from various onboard sensors 24. For example, data can be provided by a weather (Wx) radar that is onboard the producer aircraft. The data is sent to an onboard communications manager 26, which transmits the data to ground center 18 through an appropriate communication channel 16.

In one embodiment, data producers 14 can be registered on network 10 to provide real time data for use by intended consumer aircraft via ground center 18, with network 10 providing a transaction platform for the producer aircraft. In one implementation, the transaction platform can provide a producer application such as an onboard sensor utility, which can intimate ground center 18, indicating the availability and ability of the producer aircraft to produce various aeronautical data. In one embodiment, the onboard sensor utility in the producer aircraft works automatically based on requests from ground center 18. This is to ensure that the transaction platform does not cause any burden to the pilot in the producer aircraft, and allows one producer aircraft to serve multiple requests from ground center 18 without pilot intervention. The producer aircraft is capable of receiving and processing the uplinked requests to produce, and can downlink relevant data of interest to the ground system.

The communication channels 16 can include satellite communication (SATCOM) channels, air/ground cellular channels, very high frequency (VHF) channels, WiFi channels, 4G/LTE channels, AeroMACS channels, and the like. Such communication channels provide the physical media that help in transferring the data requests made by the consumer aircraft so that the data requests reach ground enter 18

The ground center 18 provides an aeronautical data aggregation and distribution system 28, which is equipped with infrastructure capable of receiving the requests from registered consumers, validating the requests, and processing the requests. During a multiple producer aircraft scenario, data aggregation and distribution system 28 is responsible for generating unified aircraft data by applying data fusion techniques.

The system 28 in ground center 18 further has the capability to check and choose available aeronautical data producers based on various criteria. For example, an automated process can be used that resolves the location of data producer aircraft, both spatially and temporally. In addition, a short list of the data producer aircrafts can be generated automatically based on various criteria, so as to have the highest probability of generating relevant data requested by a consumer aircraft. Exemplary criteria include: time of request and location of the consumer aircraft; ability of producer aircraft to produce the data that has been requested; criticality of the data that has been requested; data links supported for communication, considering both cost and criticality of data; and profile of the consumer aircraft.

The system 28 in ground center 18 can also provide an automated process to generate dynamic request tags based on the context. For example, such an automated process can consider requests received from a consumer aircraft, which are further updated with the intelligence that ground center 18 has built based on the above mentioned criteria; apply pricing algorithms; and uplink dynamically updated request tags to the short listed data producing aircrafts. The system 28 also accumulates and aggregates the data down-linked from various producer aircrafts, performs data consolidation such as by applying data fusion techniques, and uplinks the unified data to the consumer aircraft.

Apart from handling the real time requests, ground center 18 also maintains a data base based on the following considerations. The data accumulated from various producer aircrafts is preserved, which becomes one of the essential elements for data prediction algorithms. Data prediction algorithms are applied in the case where no producer aircrafts are shortlisted for any of the consumer aircraft requests and the consumer aircraft still wants to get the data. A record of all the transactions being performed is maintained, including the details of the aircraft producers, aircraft consumers that are part of the transactions, data links used, additional data derived by the ground center in case of unavailability of data requested, and the like.

Figure 2:
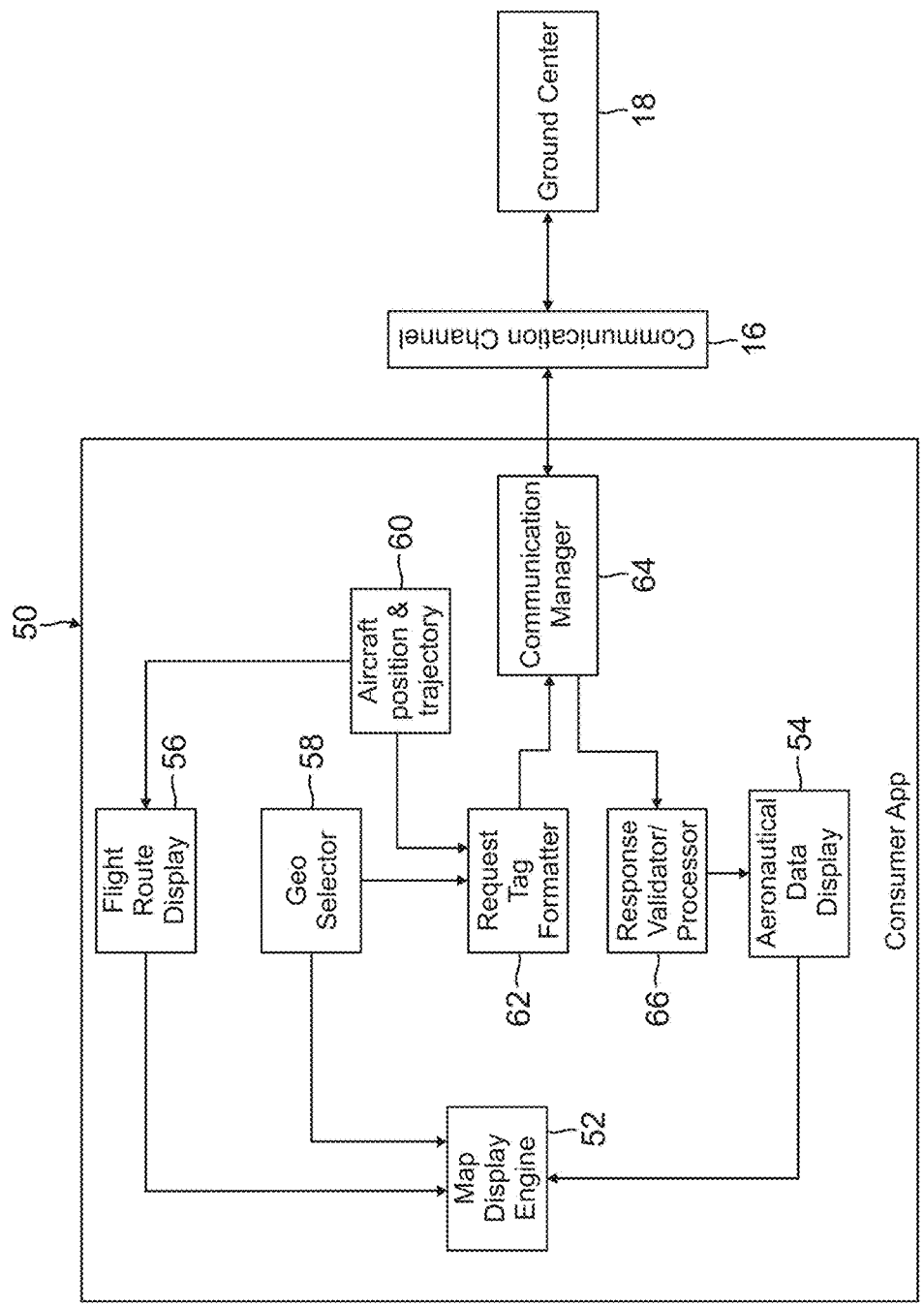
FIG. 2 is a block diagram of a mobile consumer application for use in a consumer aircraft, according to one embodiment.

FIG. 2 is a functional block diagram of an operating system 50 for a mobile consumer application that can be used in a consumer aircraft, according to one embodiment. The system 50 includes various modules associated with the consumer application, which operates on a user interface such as a hand held electronic device. The modules of system 50 are configured to aid a pilot of the consumer aircraft in making data requests to ground center 18 through communication channel 16.

The system 50 includes a map display engine 52, which receives input data from an aeronautical data display module 54, a flight route display module 56, and a geo selector module 58. The map display engine 52 provides help in overlaying the flight path (both planned and actual flight path trajectory) of the consumer aircraft. The map display engine 52 also helps in portraying the response data obtained from aeronautical data display module 54. This supports both graphical and textual data display.

The flight route display module 56 receives input data from an aircraft position and trajectory module 60, which allows the consumer aircraft's position to be overlaid as an icon along a flight path shown on a display screen of the user interface. The geo selector module 58 provides a pilot of the consumer aircraft with a mechanism on the user interface to select a particular geographical location within which the pilot is interested in knowing about the aeronautical data.

A request tag formatter 62 receives input data from geo selector module 58, and input data from aircraft position and trajectory module 60. The request tag formatter 62 constructs equivalent tags (in the specified formats that the ground center expects) for the requests selected by the pilot of the consumer aircraft. A communication manager 64 receives input data from request tag formatter 62, and aids in effectively utilizing the available communication links/network media. The communication manager 64 helps to choose the appropriate media (based on cost and priority) for sending and receiving the requests and responses to and from ground center 18 through communication channel 16.

The system 50 also includes a response validator/processor 66, which receives input data from communication manager 64. The response validator/processor 66 is responsible for validating and processing the responses obtained from ground center 18. The response validator/processor 66 outputs valid response data to aeronautical data display module 54, which generates graphics for displaying on the user interface that correspond to the valid responses received from ground center 18.

Figure 3:
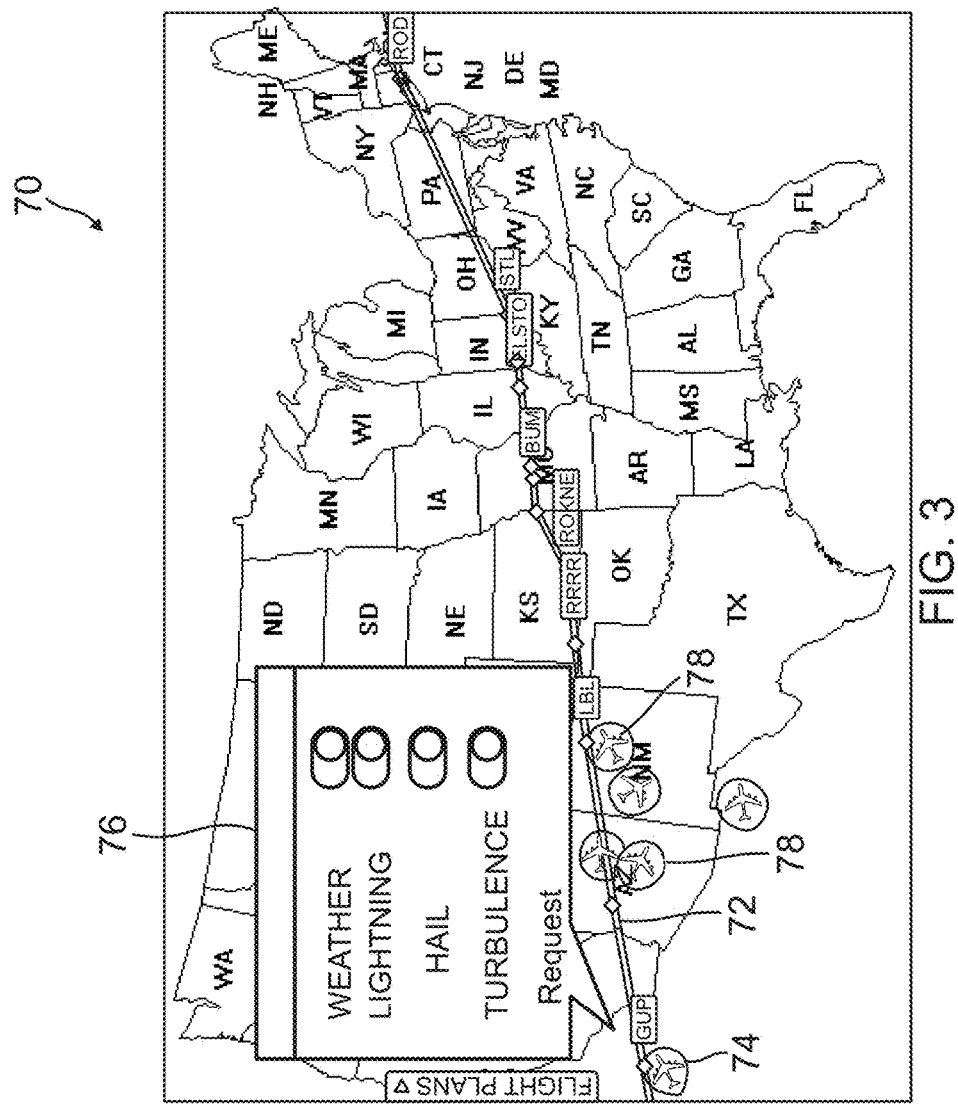
FIG. 3 illustrates an example display screen of a user interface in a consumer aircraft that allows a pilot to make a data request.

FIG. 3 illustrates an example display screen 70 of a user interface for use in a consumer aircraft that allows a pilot to make a data request using the consumer application. The display screen 70 shows a flight route 72 of the consumer aircraft (both planned route and actual route). The consumer application captures the consumer aircraft's position and displays an aircraft icon 74 that represents the consumer aircraft along flight route 72. A series of selection tabs 76 on display screen 70 allows the pilot to request data on one or more conditions along the flight route. In this example, the selection tabs 76 relate to weather, lighting, hail, and turbulence. Additional aircraft icons 78 represent other aircrafts, such as producer aircrafts, in the vicinity of flight path 72.

Figure 4:
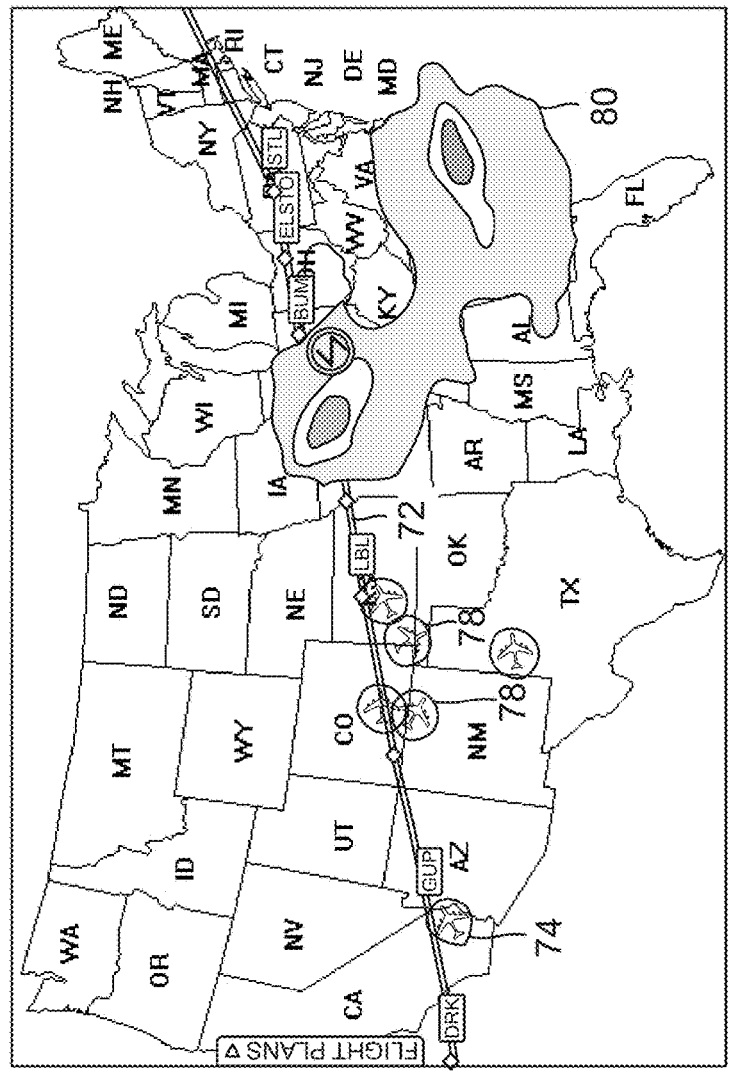
FIG. 4 illustrates the example display screen of the user interface, showing the response in graphics format to the data request made by the pilot.

FIG. 4 illustrates an example of the results shown on display screen 70 of the user interface after the pilot has made a request for weather data. The display screen 70 shows the requested weather data received from the ground center in a graphics format 80 that is along flight route 72 and ahead of the consumer aircraft represented by aircraft icon 74.

Figure 5:
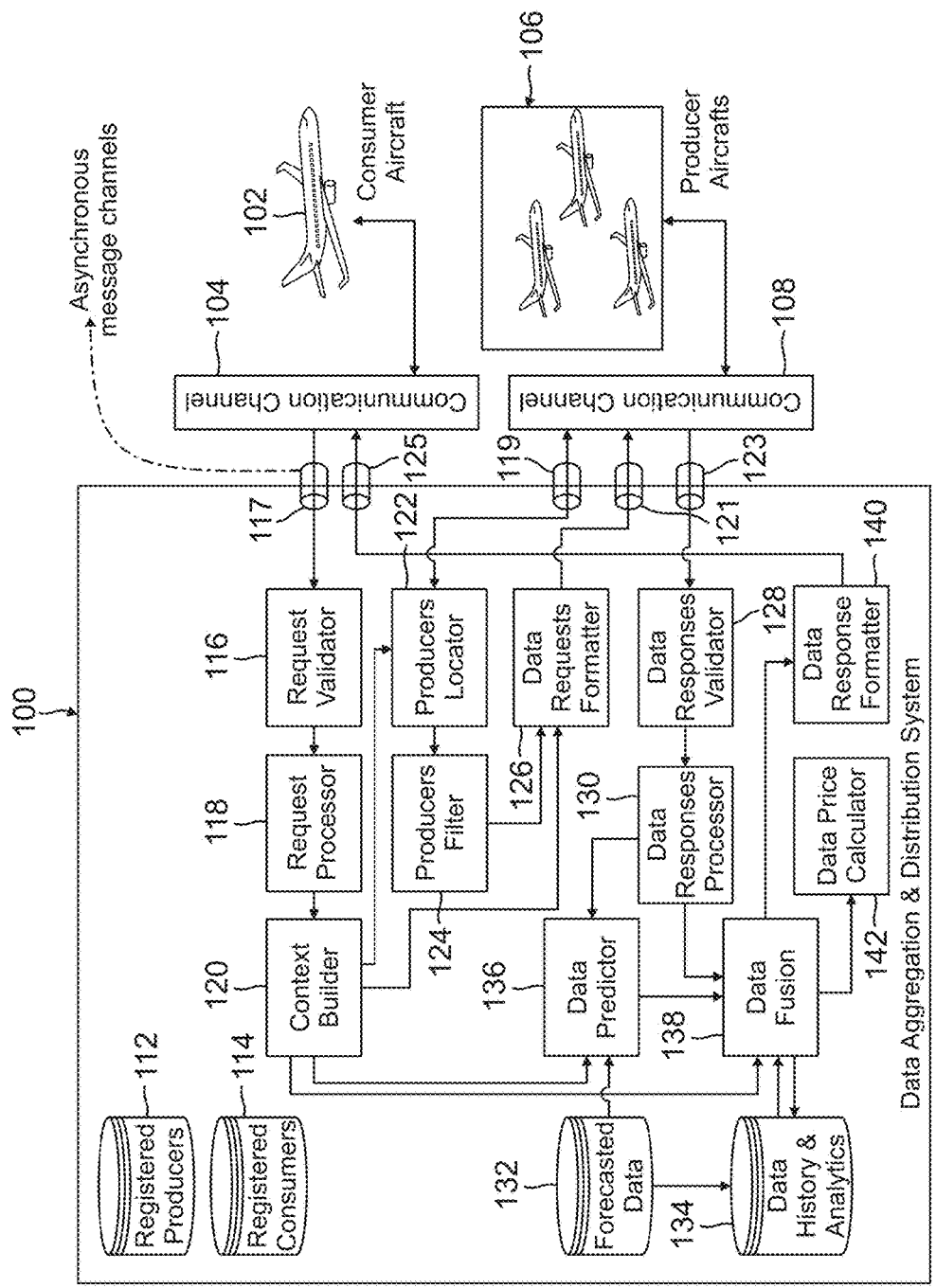
FIG. 5 is a block diagram of a data aggregation and distribution system according to one embodiment, which is located in a ground center.

FIG. 5 is a functional block diagram of a data aggregation and distribution system 100 according to one embodiment, which is located in the ground center. The system 100 includes various modules that interact to provide for the data aggregation and distribution functions. The system 100 is in operative communication with a consumer aircraft 102 through a first communication channel 104, and is also in operative communication with one or more producer aircrafts 106 through a second communication channel 108.

The system 100 maintains a repository of all registered producers 112 and all registered consumers 114, along with their customer profiles. A request validator 116 in system 100 receives a request from consumer aircraft 102, such as through an asynchronous message channel 117, for real-time aeronautical data relevant to a specific airspace. All such requests received by the ground center get validated before being processed. A request processor 118 receives validated requests from request validator 116, and is responsible for processing the validated requests received from consumer aircraft 102. A context builder module 120 receives the processed validated requests from request processor 118, and generates context information for the requested data.

A producers locator module 122 receives the context information from context builder module 120, and is in operative communication with producer aircrafts 106, such as through an asynchronous message channel 119. The producers locator module 122 spatially resolves and lists all the registered producer aircrafts from which aeronautical data can be requested, as per the data needs of the consumer aircraft. A producers filter module 124 receives input data from producers locator module 122, and filters out the located producer aircrafts that can serve the context.

A data requests formatter module 126 receives input data from context builder module 120 and producers filter module 124, while being in operative communication with producer aircrafts 106. The data request formatter 126 creates request tags and sends the request tags to each of the filtered producer aircrafts through an asynchronous message channel 121. A data responses validator module 128 receives data responses from producer aircrafts 106 through an asynchronous message channel 123. A data responses processor 130 receives input data from data responses validator module 128. The data responses validator module 128 and data responses processor 130 are responsible for validating and processing the data responses received from producer aircrafts 106.

The system 100 also maintains a repository of forecasted data 132. A repository of data history and analytics 134 is maintained automatically and contains a history of forecasted data 132, as well as requests and responses from producer and consumer aircrafts obtained through data fusion module 138. A data predictor module 136 contains data prediction algorithms and receives input data from data responses processor 130, context builder module 120, and the repository of forecasted data 132. The system 100 relies on data predictor module 136 in situations where real-time data is not available from requested producer aircrafts.

For example, if there is no real-time data being reported (due to unavailability of producer aircraft at a given geo-spatial location, issues with communication links, etc.) by all or some of the producer aircrafts, data predictor module 136 acts as the data producer. The data predictor module 136 receives forecasted data and works with the forecasted data to generate the requested data by applying data prediction algorithms over the accumulated preserved data that has been gathered for earlier requests. This requested data is then passed to a data fusion module 138 for further processing.

The data fusion module 138 also receives input data from context builder module 120 and data responses processor 130, and is in operative communication with the repository of data history and analytics 134. The data fusion module 138 is responsible for combining the data responses from the producer aircrafts 106 and the outcome of data predictor module 136. This consolidated data gets transmitted to consumer aircraft 102 through a data response formatter 140, which is responsible for formatting the data and sending it to a communication manager which uplinks data to consumer aircraft 102 through an asynchronous message channel 125. The data fusion module 138 can also send input data to a data price calculator module 142, which determines the price of the data sent to consumer aircraft 102.

Another responsibility of data fusion module 138 is to negotiate with the consumer aircraft for transacting non-requested data (knowledge of which may be essential for critical decision making). For example, if the consumer aircraft requested only weather data, and the fused response indicates hazardous phenomenon like hail/lightning as well, then the ground center sends, along with the weather response, a query whether the consumer aircraft needs the additional information regarding the hazardous phenomenon (e.g., in the form of extended response tags). These extended tags get decoded by the consumer application as text messages. The pilot of the consumer aircraft can in turn respond to these text messages, indicating whether or not there is an interest in obtaining the additional information. Based on the response received from the consumer aircraft, the ground center decides whether or not to share the additional information.

All filtered producer aircrafts may not receive requests and all requested producer aircrafts may not send responses within agreed time limits (due to network delays, network non-availability, etc.). The system 100 handles such situations by utilizing data from the repository of data history and analytics 134. This data is fused and pushed to the consumer aircraft as and when data from aircraft producers is unavailable. The repository of data history and analytics 134 also maintains a history of data flow for audit purposes. The data aggregation and distribution system 100 does not wait for all responses from all identified producer aircrafts and pushes data to consumer aircraft as and when data is available. This is to ensure that a continuously moving consumer aircraft gets timely fused data updates based on a computed refresh rate (block 232—see FIG. 9). Once all producer aircrafts responses are obtained, the consumer aircraft gets a complete picture of the situation for which it has requested data.

Figure 6:
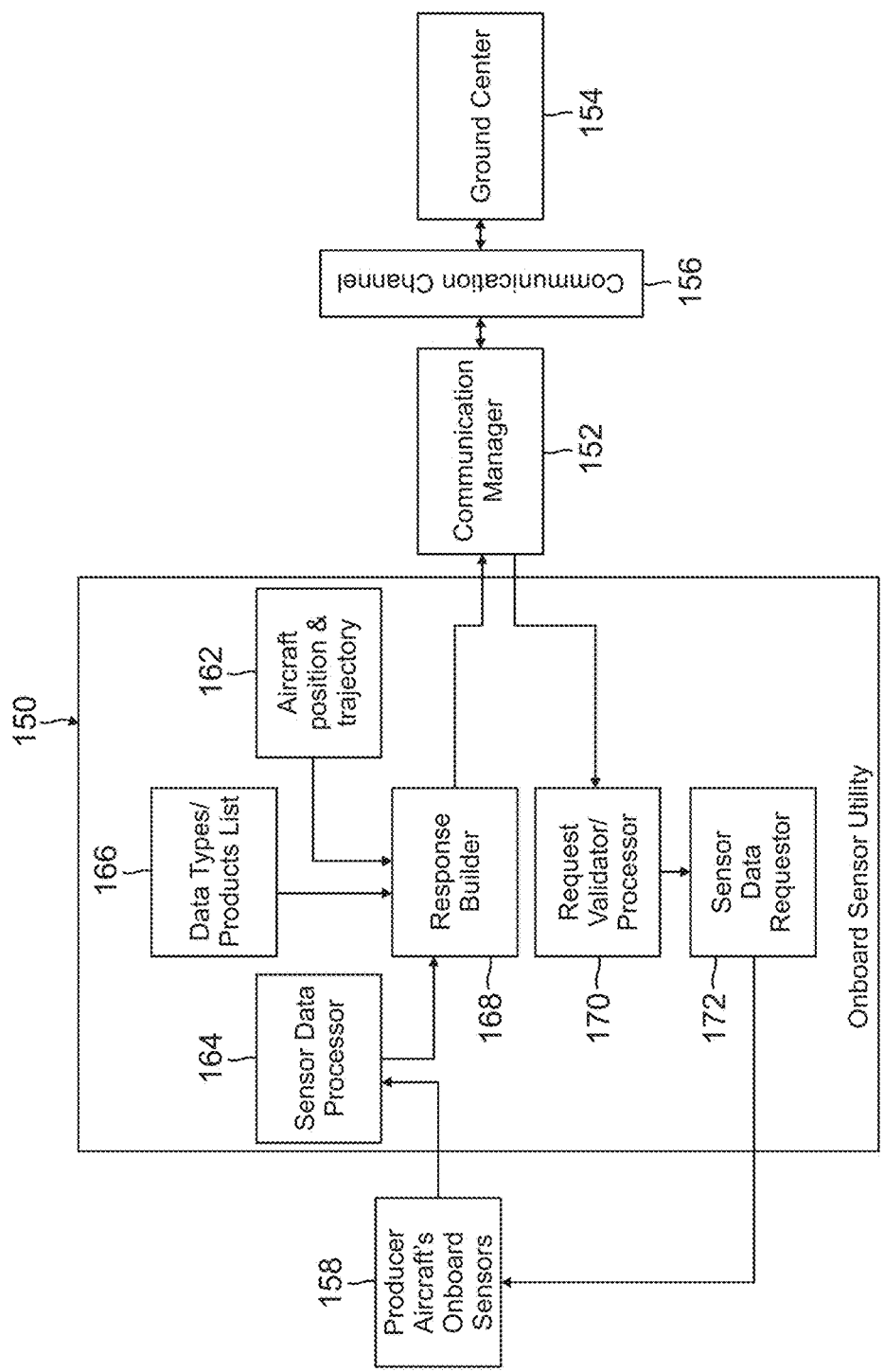
FIG. 6 is a block diagram of an onboard sensor utility application for use in a producer aircraft, according to one embodiment.

FIG. 6 is a functional block diagram of a system 150 for operating an onboard sensor utility according to one embodiment, which is used in the producer aircraft. The system 150 includes various modules that interact to provide for sensor utility functions in the producer aircraft. The system 150 operatively communicates with an onboard communication manager 152, which communicates with a ground center 154 through a communication channel 156. The system 150 also operatively communicates with one or more onboard sensors 158 in the producer aircraft.

The communication manager 152 aids in effectively utilizing the available communication links/network media, and helps to choose the appropriate media (based on cost and priority) for sending and receiving requests and responses to and from ground center 154. The communication channel 156 provides the physical media that helps in transferring the data response of the producer aircraft to ground center 154.

An aircraft position and trajectory module 162 helps in sharing position and trajectory information of the producer aircraft with ground center 154. A sensor data processor 164 interacts with onboard sensors 158 to obtain real-time sensor data. For example, data from onboard weather radar can be integrated with sensor data processor 164 to obtain weather data. A data types and products list module 166 provides a list of data types or products for which the sensor utility can get real-time information from onboard sensors 158. For example, if the producer aircraft has onboard weather radar that is linked to sensor data processor 164, then data/information related to the weather is listed.

A response builder module 168 is configured to receive input data from each of aircraft position and trajectory module 162, sensor data processor 164, and data types and products list module 166. The response builder module 168 generates a response based on type of request sent to the producer aircraft. For example, if the request is to identify a current position and trajectory of the producer aircraft, then response builder module 168 builds a response based on data from aircraft position and trajectory module 162. If the request is to obtain a list of data types or products supported by the producer aircraft, then a response is built based on data from data types/products list module 166. If the request is for a specific data type, then the response is built based on data from sensor data processor 164.

A request validator/processor 170 receives an incoming request from communication manager 152, and is responsible for validating and processing the requests obtained from ground center 154. A sensor data requestor module 172 receives input data from request validator/processor 170, and is responsible for sending a sensor data request to onboard sensors 158.

Figure 7:
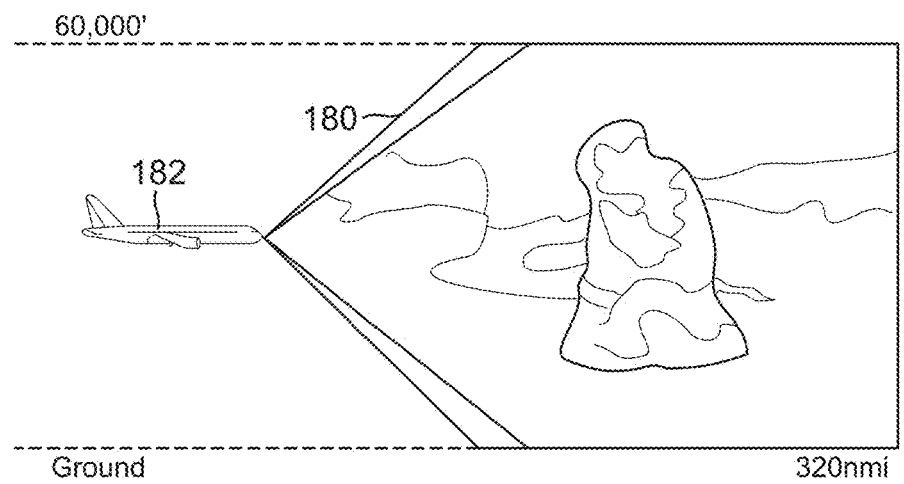
FIGS. 7 and 8 illustrate an example of how the sensor utility application in a producer aircraft can integrate with onboard sensors to capture weather data.
Figure 8:
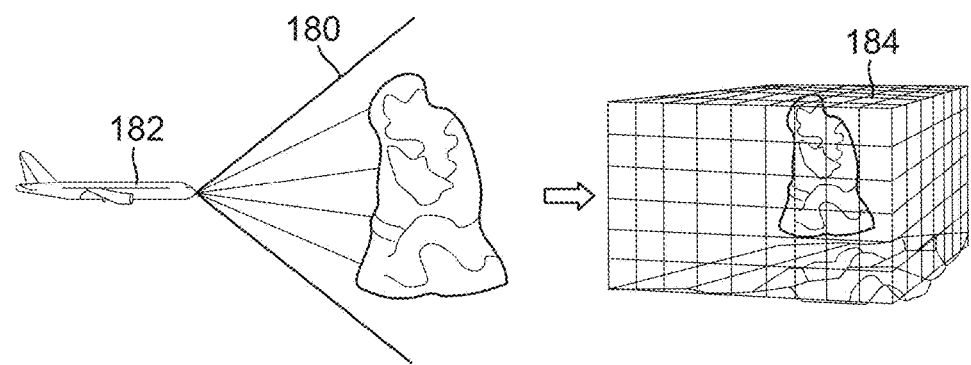

FIGS. 7 and 8 illustrate an example of how the sensor utility can integrate with onboard sensors 158 such as an onboard weather radar in the producer aircraft. FIG. 7 is a side view of a weather condition scan 180 as seen by the weather radar of a producer aircraft 182 that has a scan range of about 320 nmi. FIG. 8 shows a three-dimensional (3D) volumetric scan 184 that is generated based on weather condition scan 180 by the weather radar. The 3D volumetric scan 184 captures all weather data within the scanning volume.

The processing of weather condition scan 180 is done at two levels: first, in a software utility of the weather radar, and second, by sensor data processor 164 in the sensor utility. The sensor data processor 164 can interact with the software utility of the weather radar to make specific spatial queries based on the request received by sensor utility from the ground center, and to obtain specific weather information from a 3D volumetric buffer processed by the software utility of the weather radar. Based on the output obtained from sensor data requester module 172, the software utility of the weather radar resolves the vertical and horizontal extent (based on the geospatial coordinates and the flight levels obtained from the ground request) of data that need to be extracted out of the 3D volumetric buffer. Based on the resolutions at which the data is being detected, sensor data processor 164 associates a confidence level for the data that is being extracted for further use by the ground center.

Identifying Context Based on Request from Consumer Aircraft

Figure 9:
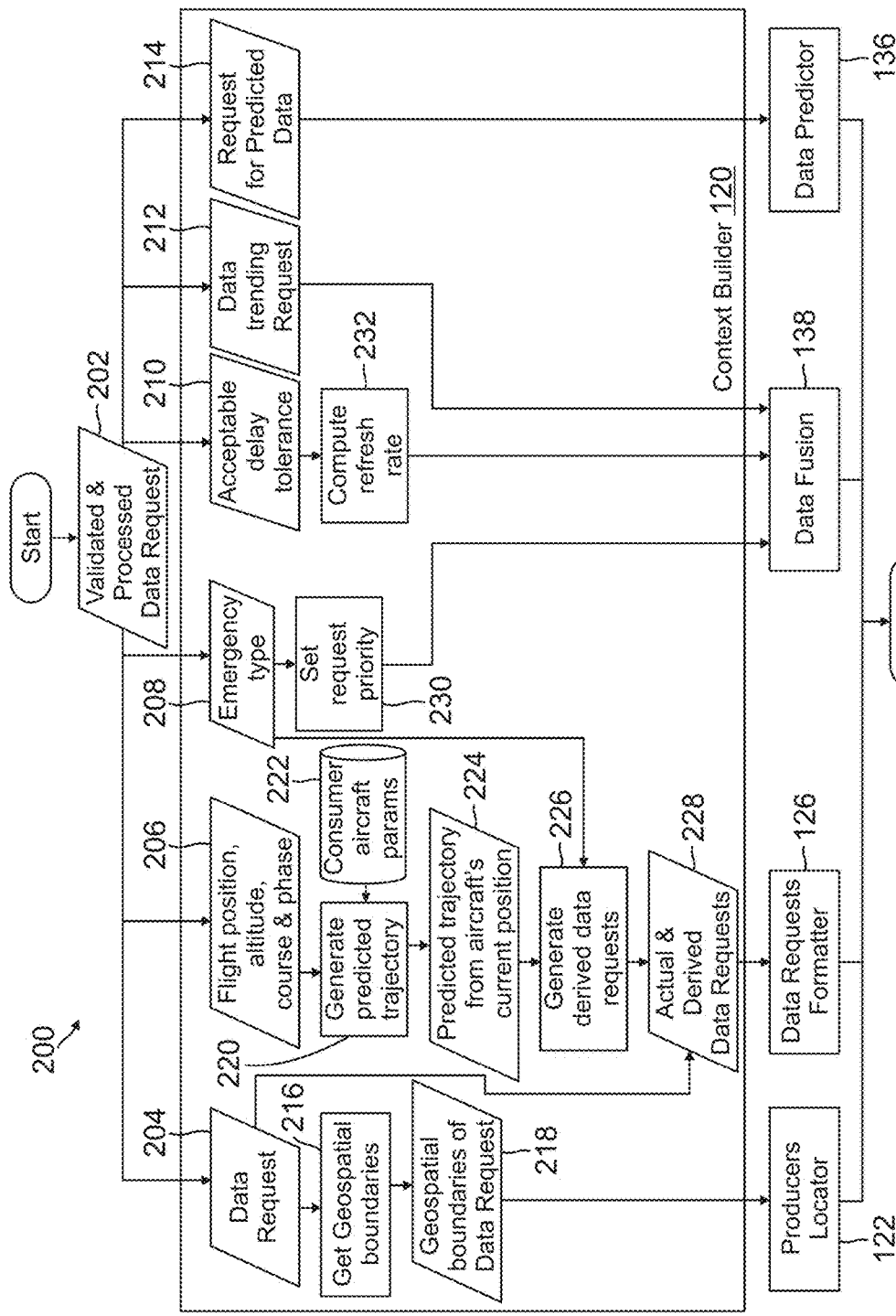
FIG. 9 is a flow diagram of a method for operating a context builder module in the data aggregation and distribution system of FIG. 5.

FIG. 9 is a flow diagram of a method 200 for operating context builder module 120 in data aggregation and distribution system 100. In general, method 200 identifies context based on a request from a consumer aircraft, with the output of request validator 116 and request processor 118 provided as an input to context builder module 120. (FIG. 5).

As shown in FIG. 9, method 200 starts with reception of a validated and processed data request (block 202). The data request from the consumer aircraft can include various types of requests and information. For example, the data request can include a request for weather data (block 204), a request for runway conditions, and the like. The data request can also include the consumer aircraft's flight position coordinates (latitude, longitude, altitude), course, and phase information (block 206) at the time of the request. The data request can include an emergency type parameter (block 208), which is set by the consumer aircraft to indicate the emergency or immediate need for the data being requested. This information can be utilized by the ground center, in case there are multiple consumer aircrafts simultaneously requesting data, to define the priorities for processing the data requests from the consumer aircrafts.

The data request can also include an acceptable delay tolerance (block 210), which indicates a time within which the consumer aircraft expects a response from the ground center after sending the data request. The data request can further include a data trending request (block 212), which is issued by the pilot of the consumer aircraft in case there is a need to understand how the weather is evolving at a particular zone of interest (latitude, longitude, and altitude). Knowledge of this information can be further used for making tactical decisions by the pilot. The data request can also include a request for predicted data (block 214). This information is needed when no real-time data is currently available. For example, the pilot can request predicted weather data when real-time weather data is not available.

When there is a request for data (block 204), the method extracts geospatial boundaries (block 216), which comprise polygons containing points represented by latitude, longitude, and altitude for the region of interest. The geospatial boundaries for the data request are then determined (block 218). This information is then sent to producers locator module 122, and becomes the basis for a producer locator algorithm (described further hereafter with respect to FIG. 10).

When the data request includes the flight position, course, and phase information (block 206), method 200 generates a predicted trajectory (block 220) using a standard flight dynamics model. The predicted trajectory can be generated using an input of consumer aircraft parameters (block 222), which are aircraft performance related parameters available in the form of a database for all registered consumer aircrafts. A predicted trajectory in then determined from the consumer aircraft's current position (block 224). Based on the aircraft parameters and type of emergency (if any), method 200 then generates data derived data requests (block 226) other than the original data requests from the consumer aircraft. The method 200 uses the predicted trajectory and aircraft parameters to identify the derived data requests. The actual data requests and derived data requests (block 228) are then sent to data requests formatter module 126.

The method 200 can pick derived data types from pre-set data types. Various criteria can be employed for identifying data types in the derived data requests, including the data types not already included in the actual data request made by the consumer aircraft, and data types that meet flight levels in predicted trajectory. For example, a derived data request can contain flight level range in which data is required. This flight level range is determined by the predicted trajectory for consumer aircraft. Other criteria include the data types in derived data requests that meet the needs of aircraft type and flight dynamics. For example, the impact of turbulence (weather phenomenon) may vary with the dimension of the aircraft, which can be derived from the consumer aircraft database. While there may not be a request for turbulence in the original data request, the request for turbulence may get included in the derived request based on the dimensions of the consumer aircraft.

When the data request includes an emergency type parameter (block 208), method 200 sets a priority to processing the request (block 230) from the consumer aircraft. This is to ensure that an emergency declared by the consumer aircraft gets more preference over a consumer aircraft with lesser or no emergency situation. The set priority level is then sent to data fusion module 138 and is used to drive a data fusion algorithm (described further hereafter).

When the data request includes an acceptable delay tolerance (block 210), method 200 computes a refresh rate (block 232) based on the delay tolerance. The refresh rate is then sent to data fusion module 138. This refresh rate is needed to automatically push response data to the consumer aircraft as and when available. When the data request includes a data trending request (block 212), method 200 sends the data trending request directly to data fusion module 138 for further processing. When the data request includes a request for predicted data (block 214), method 200 provides the data prediction request directly to data predictor module 136 for further processing.

Identifying Producer Aircrafts that can Process Data Requests

Figure 10:
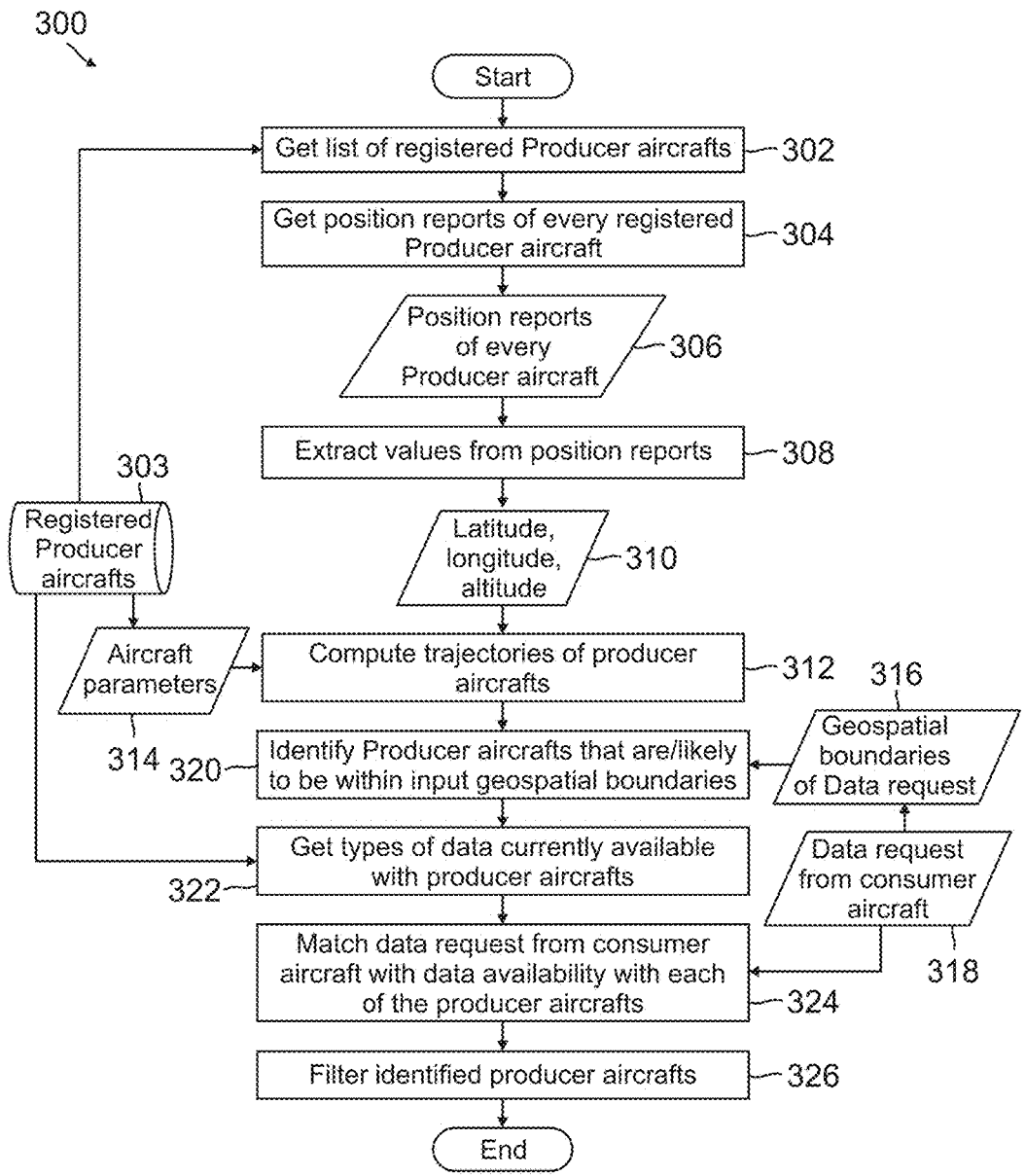
FIG. 10 is a flow diagram of a method for identifying one or more producer aircrafts that can process data requests.

FIG. 10 is a flow diagram of a method 300 for identifying one or more producer aircrafts that can process data requests. The method 300 operates in producers locator module 122 and producers filter module 124 of data aggregation and distribution system 100 (FIG. 5).

As shown in FIG. 10, method 300 starts by getting a list of registered producer aircrafts (block 302) from a database 303 of registered producer aircrafts. The method 300 then gets a live feed of position reports for all the registered producer aircrafts (block 304). Once the position reports of every producer aircraft are obtained (block 306), relevant values are extracted from the position reports (block 308), which include values of latitude, longitude, and altitude (block 310) as basic parameters. The trajectories of producer aircrafts are then computed (block 312) based on the position reports, as well as aircraft parameters (block 314) obtained from database 303.

Using geospatial boundaries of the data request (block 316) from the consumer aircraft data request (block 318), and based on the computed trajectories of the producer aircrafts (block 312), method 300 then identifies a list of producer aircrafts that are or likely to be within the relevant input geospatial boundaries (block 320). As all producer aircrafts are moving (non stationary), to identify the likelihood of a producer aircraft being within the requested geospatial boundaries, the method 300 uses the following cases: (1) the producer aircraft is well within requested geospatial boundaries and will be within the geospatial boundaries by the time it sends a response to the ground center; (2) the producer aircraft is outside the requested geospatial boundaries but based on predicted trajectory, will be entirely within the boundaries by the time the producer aircraft sends a response to the ground center; (3) the producer aircraft is just about to move out of requested geospatial boundaries but based on predicted trajectory, will be entering into the boundaries by the time the producer aircraft sends a response to the ground center.

The method 300 then gets a set of data types currently available with the identified producer aircrafts (block 322) from database 303. Each of the data types available with each of the identified producer aircrafts is then matched with each of the data types requested by the consumer aircraft (block 324). The method 300 then filters the identified producer aircrafts (block 326). As such, each identified producer aircraft that can provide the requested data for at least one data type from the requested set of data types is marked as available for further processing.

Figure 11:
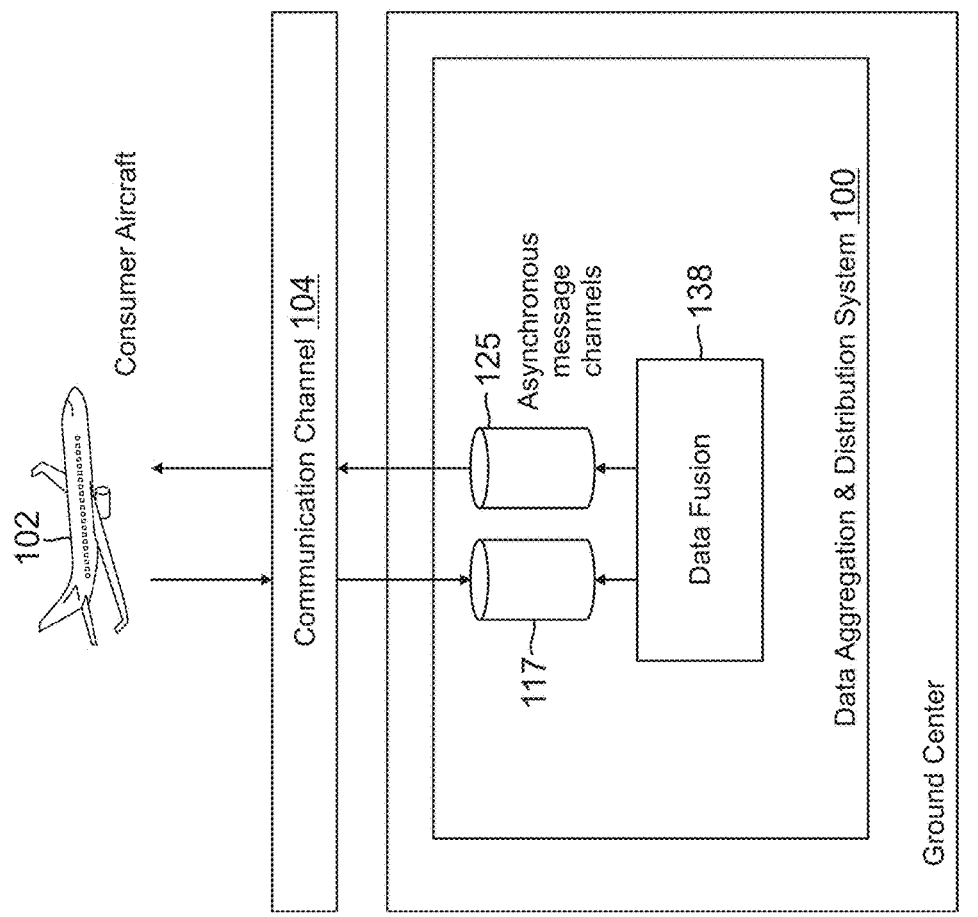
FIG. 11 is a block diagram illustrating a method of handling delays in making requests to and getting responses from a producer aircraft.

Handling Delays in Making Requests to and Getting Responses from Producer Aircrafts A method of handling delays in making requests to and getting responses from producer aircrafts is also provided, and is implemented in data requests formatter module 126 and data responses validator module 128 of data aggregation and distribution system 100 (FIG. 5). In general, the ground center adopts an asynchronous mode of data exchange with stakeholders (consumer and producer aircrafts) to ensure that there is no data loss due to network delays. The ground center uses refresh rates computed by context builder module 120 (derived from delay tolerance) and asynchronously updates responses to consumer aircraft for data requests as and when responses from producer aircrafts are available. The method of handling delays is illustrated in FIG. 11, where data aggregation and distribution system 100 in the ground center adopts an asynchronous mode of data exchange using asynchronous message channels 117 and 125, which communicate with consumer aircraft 102 through communication channel 104. The data fusion module 138 uses auto asynchronous mode updates depending upon the geospatial nature of data responses from producer aircrafts.

If total time taken for response from the ground center is less than or equal to a maximum allowed delay, then the response from the ground center to the consumer aircraft for a data request is acceptable. In brief, the response time needed by the ground center to respond to a request sent by a consumer aircraft is influenced by the time consumed by the uplink and downlink procedures and also the time consumed by the ground center to perform various processing steps. The following equation captures various factors that contribute towards the delays that incur in sending a response (by the ground center) to a particular request (from the consumer aircraft):

total time taken for response from ground center=time taken for request to flow from consumer aircraft to ground center (includes downlink delay)+time taken to locate producer aircrafts (includes uplink and downlink delays)+ time taken to filter located producer aircrafts+ time taken to send requests to all filtered producer aircrafts (includes uplink delays)+time taken to receive and process responses from producer aircrafts (includes downlink delays)*+ time taken for data fusion process*+time required to send processed data (response) to consumer aircraft (includes uplink delay)*.

In the above equation, the three parameters with (*) notation are computed for each asynchronous auto update that the ground center makes to the consumer aircraft for a given data request.

Data Fusion

In a multiple producer aircraft environment, there is a certain possibility that the ground center will receive responses from more than one producer aircraft for the same geospatial coordinates. In such scenarios, ground center fuses the data collected from various producer aircrafts and generates unified data. The resolution with which the producer aircraft is able to detect the weather at a zone of interest is one important parameter that drives the data fusion. These resolutions are parameterized into confidence levels and shared along with the response data.

Figure 12:
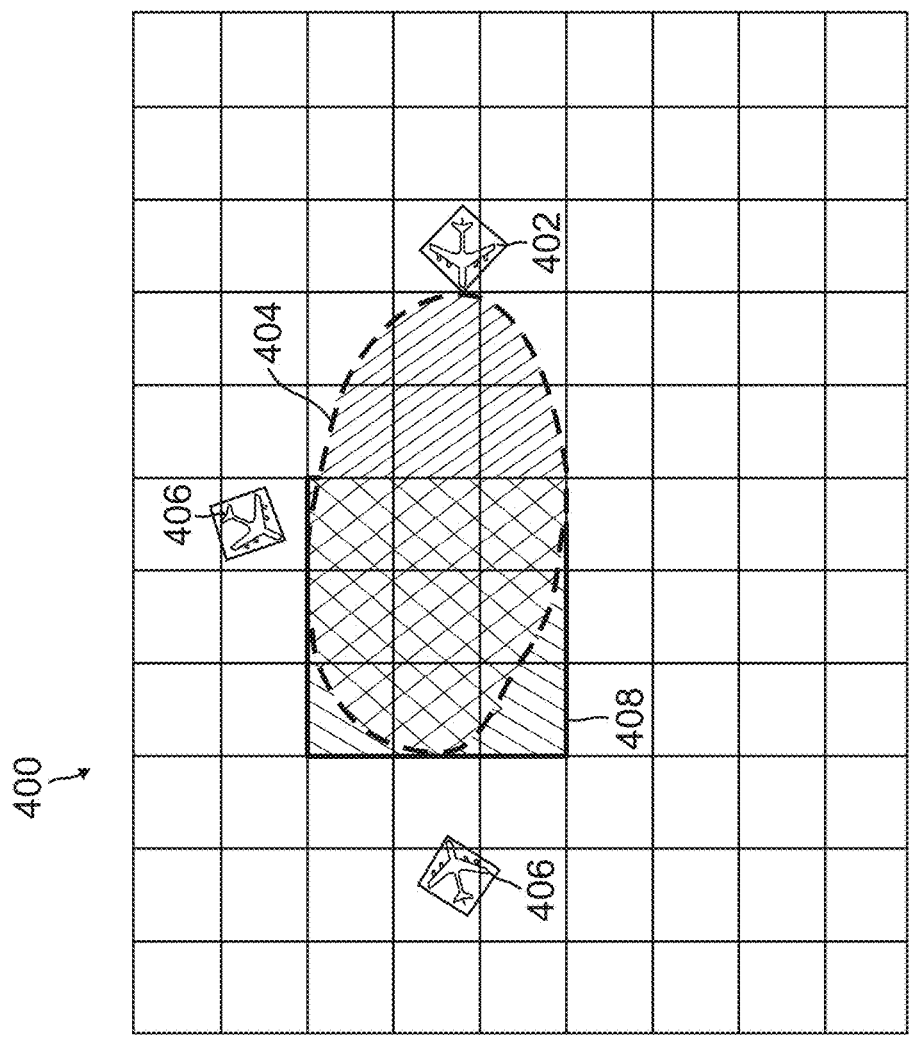
FIG. 12 illustrates an example data fusion scenario where a pilot of a consumer aircraft wants to receive weather data for a particular geospatial region.

FIG. 12 illustrates an example data fusion scenario 400, where a pilot of a consumer aircraft 402 wants to receive weather data for a geospatial region 404 along the flight path. Using the consumer application, the pilot selects the geospatial region for which weather data is desired. The details of the selected region are communicated to the ground center along with the flight level of consumer aircraft 402. The data aggregation and distribution system in the ground center identifies producer aircrafts 406 that can provide real-time weather data for geospatial region 404 using a grid format 408.

The region where producer aircrafts can provide real-time weather data have the following possibilities: the region is looked at by a lone producer aircraft with a particular course and flight level; the region is looked at by multiple producer aircrafts from different courses and flight levels; and the region is looked upon by none of the registered producer aircrafts. The producer aircrafts available at the time of data request processing may not cover the entire geospatial boundary, in which case, data fusion looks for predicted data to provide a complete picture of the situation (e.g., weather) in the selected region.

Figure 13:
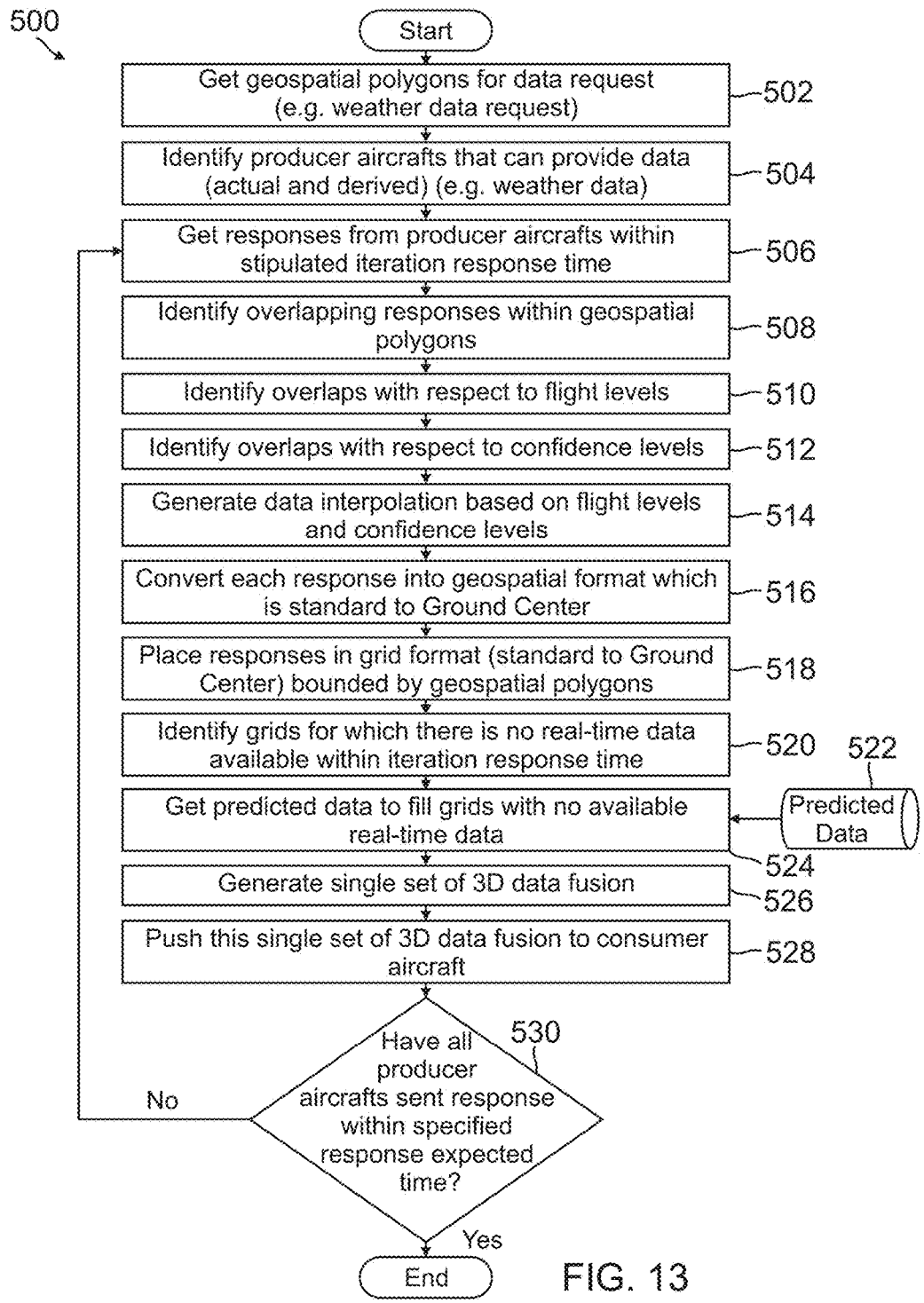
FIG. 13 is a flow diagram of a method for data fusion, which operates in the data aggregation and distribution system of FIG. 5.

FIG. 13 is a flow diagram of a method 500 for data fusion, which operates in data fusion module 138 of data aggregation and distribution system 100 (FIG. 5). As shown in FIG. 13, method 500 starts by getting geospatial regions (defined as polygons) for a data request (block 502), such as a weather data request, obtained from a consumer aircraft. Next, producer aircrafts are identified that can provide data (actual and derived) (block 504), such as weather data. The method 500 then gets responses from producer aircrafts within a stipulated iteration response time (block 506). The stipulated iteration response time is defined as a time out interval within which responses from producer aircrafts are considered for one iteration. Overlapping responses within the geospatial polygons are then identified (block 508), and overlaps for responses with respect to flight levels (e.g., 0 to 60,000 feet altitude above ground level (AGL)) are identified (block 510).

The method 500 then identifies overlaps with respect to confidence levels (block 512). For regions where there are overlaps identified, the data with the highest confidence level is used to represent data quality (e.g., weather reflectivity). In case the confidence levels also match, then the highest quality data (e.g., highest weather reflectivity) obtained is used to represent the data (e.g., weather reflectivity) at that particular overlapping region. Data interpolation is then generated based on the flight levels and the confidence levels (block 514). With such data interpolation, unified response data is defined across the geospatial polygons. The confidence level of a data point for a producer aircraft is defined, for example, as a numeric entity that is inversely proportional to the modular distance at which data is requested for and the flight level at which the data point is available from the producer aircraft.

The method 500 then converts each response into the geospatial format which is standard to the ground center (block 516). The method 500 then places responses in a grid format (standard to the ground center) bounded by geospatial polygons (block 518). Responses from onboard sensors of the producer aircraft are based on standard formats. The ground center can also use a standardized geospatial format for better quality in data fusion. For example, the ground center can use standard geospatial 3D layers to overlap responses from producer aircrafts.

Optionally, method 500 can identify grids that represent geospatial regions for which there is no real-time data available within the iteration response time (block 520). The method 500 can access a predicted data repository 522 to get predicted data to fill the grids for which no real-time weather data is available in this iteration (block 524). The pilot in the consumer aircraft has an option to select predicted weather data where real-time data is not available. The advantage of this is that consumer aircraft gain access to a complete picture of the situation (e.g., weather situation) within selected geospatial polygons. This step of identifying grids to be filled with predicted data can be skipped in case the user does not want this feature. The grids can be filled with real-time data in subsequent iterations based on real-time data availability in the subsequent iterations.

The method 500 then generates a single data set of 3D data fusion (block 526). This single data set of 3D data fusion is pushed to the consumer aircraft (block 528), providing a 3D view, plan view, and vertical view of the complete picture of the situation (e.g., weather situation). A determination is then made whether all producer aircrafts have sent a response within the specified response expected time (block 530). If not, method 500 repeats starting at block 506 until all identified producer aircrafts have responded to requests from the ground center. The iterations of method 500 ensure that the consumer aircraft does not have to wait for a consolidated picture of the situation until all requested producer aircrafts respond. When producer aircrafts do respond, data is fused and a consolidated picture for that iteration is sent to the consumer aircraft. It should be noted that all producer aircrafts will not respond at the same time due to their position and alignment in the airspace in which the data request is made, and also due to network delays during data transactions between the ground center and producer aircrafts.

Data Trending

As described previously with respect to FIG. 9, one of the requests that the consumer aircraft can make is a data trending request. Data trending is quite useful in scenarios where the consumer aircraft pilot wants to understand how the weather is evolving in a particular airspace region.

Figure 14:
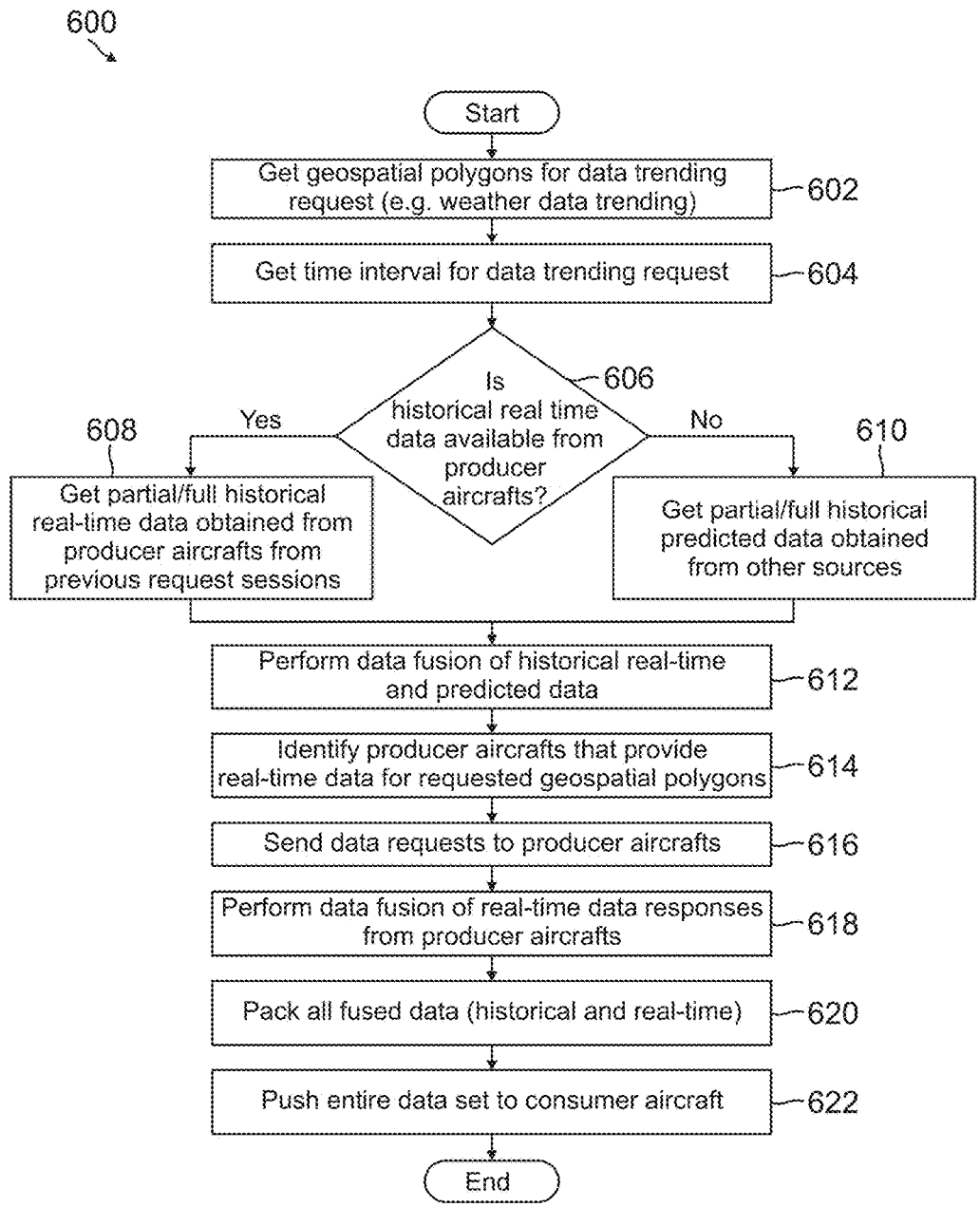
FIG. 14 is a flow diagram of a method for data trending, which operates in data aggregation and distribution system of FIG. 5.

FIG. 14 is a flow diagram of a method 600 for data trending, which operates as part of data fusion module 138 of data aggregation and distribution system 100 (FIG. 5). As shown in FIG. 14, method 600 starts by getting geospatial polygons for a data trending request (e.g., weather data trending) obtained from a consumer aircraft (block 602). The method 600 then gets a time interval for the data trending request (block 604). A determination is then made whether historical real-time data is available from producer aircrafts (block 606). If yes, method 600 gets partial/full historical real-time data obtained from producer aircrafts from previous request sessions (block 608). If historical real-time data is not available, method 600 gets partial/full historical predicted data obtained from other sources in the ground center (block 610). If for the requested geospatial polygon regions historical real-time data alone suffices, then method 600 relies completely on historical real-time data for the trending request. Otherwise, method 600 can also use the historical predicted data to address the trending request.

Data fusion is then performed on the historical real-time data and historical predicted data (block 612) to get a data trend for the given time interval. The trending request can also include a data request for current time so that the user can see data trends over a period of time until the current time. In such a case, method 600 identifies producer aircrafts that provide real-time data for requested geospatial polygon regions (block 614). The method 600 then sends data request tags to producer aircrafts (block 616), and performs data fusion of real-time data responses from producer aircrafts (block 618). The method 600 then packs all fused data (both historical and real-time) (block 620), and pushes the entire data set to the consumer aircraft (block 622). The consumer application in the consumer aircraft can then playback the entire data set for the time interval to visually display data trending.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for data aggregation and distribution, the system comprising: a context builder module configured to receive a validated and processed data request from a consumer, the context builder module configured to generate context information for the data request from the consumer; a producers locator module configured to receive the context information from the context builder module and in operative communication with one or more producers, the producers locator module configured to spatially resolve and generate a list of the producers from which data can be requested; a producers filter module configured to receive the list of the producers from the producers locator module, the producers filter module configured to select one or more of the producers that are capable of providing data relevant to the context information for the data request; a data requests formatter module configured to receive the context information from the context builder module and a list of selected producers from the producers filter module, the data requests formatter configured to send the data request to the selected producers; a data responses validator module configured to receive and validate data responses from the selected producers; a data responses processor configured to receive and process the validated data responses from the data responses validator module; a data predictor module configured to receive the validated and processed data responses from the data responses processor and to receive the context information from the context builder module, the data predictor module configured to generate data prediction information based on accumulated preserved data gathered for one or more prior data requests; and a data fusion module configured to receive the validated and processed data responses from the data responses processor, the context information from the context builder module, the data prediction information from the data predictor module, and data from a data history and analytics repository; wherein the data fusion module is operative to combine the validated and processed data responses from the producers with the data prediction information to generate a consolidated data response for the consumer; wherein the data fusion module considers the data prediction information upon receiving a request for predicted data from the consumer when real-time data is not available from the producers.

Example 2 includes the system of Example 1, wherein the system is located in a ground center.

Example 3 includes the system of any of Examples 1-2, wherein the data request formatter module creates request tags and sends the request tags to each of the selected producers through an asynchronous message channel.

Example 4 includes the system of any of Examples 1-3, wherein the data predictor module is in operative communication with a repository of forecasted data.

Example 5 includes the system of Example 4, wherein the data fusion module is in operative communication with a repository of data history and analytics that communicates with the repository of forecasted data.

Example 6 includes the system of any of Examples 1-5, further comprising a data response formatter module configured to receive the consolidated data response from the data fusion module, the data response formatter module operative to have the consolidated data response transmitted to the consumer.

Example 7 includes the system of any of Examples 2-6, further comprising a repository of registered producer aircrafts and registered consumer aircrafts.

Example 8 includes the system of any of Examples 1-7, wherein the data fusion module is in operative communication with a data price calculator module that determines a price of the consolidated data response for the consumer.

Example 9 includes the system of any of Examples 1-8, wherein the context builder module comprises a non-transitory computer readable medium having processor executable instructions stored thereon to perform a method for identifying context based on a data request from a consumer aircraft, the method comprising: receiving a validated and processed data request from the consumer aircraft, the data request including one or more items of information comprising flight position coordinates, course, and phase information for the consumer aircraft; a request for data; an emergency type parameter; an acceptable delay tolerance; a data trending request; or a predicted data request. When the validated and processed data request includes a request for data (e.g., weather data), the method comprises extracting geospatial boundaries from the data request comprising polygons that contain points represented by latitude, longitude, and altitude for the region of interest; determining the geospatial boundaries for the data request; and sending information on the geospatial boundaries to the producers locator module. When the data request includes the flight position coordinates, the method comprises generating a predicted trajectory of the consumer aircraft; generating a predicted trajectory from a current position of the consumer aircraft; generating derived data requests other than the original data request from the consumer aircraft; and sending the original data request and the derived data requests to the data requests formatter module. When the data request includes an emergency type parameter, the method comprises setting a request priority for the data request; and sending the set request priority to the data fusion module. When the data request includes an acceptable delay tolerance, the method comprises computing a refresh rate based on the delay tolerance; and sending the refresh rate to the data fusion module. When the data request includes a data trending request, the method comprises sending the data trending request to the data fusion module. When the data request includes a predicted data request, the method comprises sending the predicted data request to the data predictor module.

Example 10 includes the system of any of Examples 1-9, further comprising a non-transitory computer readable medium having processor executable instructions stored thereon to perform a method for identifying producer aircrafts capable of responding to a data request, the method comprising obtaining a list of registered producer aircrafts from a database; obtaining position reports for all the registered producer aircrafts; extracting relevant values from the position reports, including values of latitude, longitude, and altitude of the registered producer aircrafts; computing trajectories of the registered producer aircrafts based on the position reports and aircraft parameters obtained from the database; obtaining geospatial boundaries of a data request from a consumer aircraft; based on the computed trajectories of the registered producer aircrafts, identifying a list of registered producer aircrafts that are or likely to be within the geospatial boundaries; obtaining a set of data types currently available with the identified producer aircrafts from the database; matching the data request from the consumer aircraft with the data types currently available for the identified producer aircrafts; and filtering the identified producer aircrafts capable of providing a response to the data request.

Example 11 includes the system of any of Examples 1-10, wherein the system handles delays in making requests to and getting responses from producer aircrafts by using an asynchronous mode of data exchange with a consumer aircraft using asynchronous message channels, with the data fusion module configured to send asynchronous mode updates depending upon the geospatial nature of the data responses from the producer aircrafts.

Example 12 includes the system of any of Examples 1-11, wherein if total time taken for a data response from the ground center to the consumer aircraft is less than or equal to a maximum allowed delay, then the data response from the ground center to the consumer aircraft is acceptable.

Example 13 includes the system of Example 12, wherein the total time taken for a data response from the ground center to the consumer aircraft comprises time taken for the data request to flow from the consumer aircraft to the ground center; time taken to locate the producer aircrafts; time taken to filter the located producer aircrafts; time taken to send requests to all filtered producer aircrafts; time taken to receive and process responses from the producer aircrafts; time taken for data fusion; and time required to send the data response to the consumer aircraft.

Example 14 includes the system of any of Examples 1-13, wherein the data fusion module comprises a non-transitory computer readable medium having processor executable instructions stored thereon to perform a method of data fusion, the method of data fusion comprising: (a) obtaining a geospatial region for a data request from a consumer aircraft; (b) identifying producer aircrafts capable of providing a response to the data request; (c) obtaining responses to the data requests from the identified producer aircrafts within a stipulated iteration response time; (d) identifying overlapping responses within the geospatial region; (e) identifying the overlapping responses with respect to flight levels; (f) identifying overlapping responses with respect to confidence levels; (g) generating data interpolation based on the flight levels and the confidence levels; (h) converting each of the responses into a geospatial format; (i) placing the responses in a grid format bounded by geospatial polygons; (j) generating a single data set of 3D data fusion; (k) sending the single data set of 3D data fusion to the consumer aircraft; (l) determining whether all identified producer aircrafts have sent a response within the iteration response time; and (m) if all identified producer aircrafts have not sent responses, the method of data fusion is repeated starting at step (c) until all identified producer aircrafts have responded within a specified response expected time.

Example 15 includes the system of Example 14, wherein prior to generating a single data set of 3D data fusion, the method further comprises identifying one or more grids for which there is no real-time data available within the iteration response time; and obtaining predicted data to fill the one or more grids for which no real-time data is available.

Example 16 includes the system of any of Examples 1-15, wherein the data fusion module comprises a non-transitory computer readable medium having processor executable instructions stored thereon to perform a method of data trending, the method of data trending comprising obtaining geospatial polygon regions for a data trending request from a consumer aircraft; obtaining a time interval for the data trending request; determining whether historical real-time data is available from producer aircrafts; obtaining partial or full historical real-time data from the producer aircrafts when available; optionally obtaining partial or full historical predicted data from a ground center; performing data fusion of the available historical real-time data and the historical predicted data when obtained; identifying producer aircrafts that provide current real-time data for the geospatial polygon regions; sending data request tags to the identified producer aircrafts; performing data fusion of current real-time data responses from the identified producer aircrafts; packing all historical and current real-time data into a fused data set; and sending the fused data set to the consumer aircraft.

Example 17 includes the system of Example 16, wherein the data trending request comprises a weather data trending request.

Example 18 includes a system for operating a mobile consumer application on an electronic user interface in a consumer aircraft, the system comprising: an aircraft position and trajectory module configured to obtain position and trajectory information for the consumer aircraft; a flight route display module configured to receive output data from the position and trajectory module, the flight route display module configured to have a position of the consumer aircraft overlaid as an icon along a flight path shown on the user interface; a geo selector module configured to provide a mechanism on the user interface to select a particular geographical location for which aeronautical data is to be requested; a request tag formatter configured to receive output data from the geo selector module and from the aircraft position and trajectory module, the request tag formatter configured to construct request tags corresponding to requested aeronautical data; a communication manager configured to receive the request tags from the request tag formatter, wherein the communication manager is configured to send the request tags to a ground center and to receive responses to the request tags from the ground center; a response validator and processor configured to receive and validate the responses from the communication manager; an aeronautical data display module configured to receive valid responses from the response validator and processor, the aeronautical data display module configured to generate graphics for the user interface that correspond to the valid responses; and a map display engine configured to receive output data from the flight route display module, the geo selector module, and the aeronautical data display module, the map display engine providing aid in overlaying a flight path of the consumer aircraft on the user interface and in portraying the graphics generated by the aeronautical data display module; wherein the consumer application allows a user in the consumer aircraft to make data requests to the ground center through a communication channel.

Example 19 includes a system for operating an onboard sensor utility in a producer aircraft, the system comprising: an aircraft position and trajectory module configured to obtain position and trajectory information for the producer aircraft; a sensor data processor operatively coupled to one or more onboard sensors in the producer aircraft to obtain real-time sensor data; a data types and products list module configured to provide a list of data types or products for which real-time sensor data is available from the onboard sensors; a response builder module configured to receive output data from each of the aircraft position and trajectory module, the sensor data processor, and the data types and products list module, the response builder module configured to generate a response based on a data request received by the producer aircraft from a ground center; a request validator and processor configured to receive a data request from the ground center through an onboard communication manager, the request validator and processor configured to validate the data request; and a sensor data requestor module configured to receive the validated data request from the request validator and processor, the sensor data requestor configured to send a sensor data request to the onboard sensors.

Example 20 includes the system of Example 19, wherein the onboard sensors (e.g., onboard weather radar) are integrated with the sensor data processor to obtain the real-time sensor data (e.g., weather data).

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for data aggregation and distribution, the system comprising:
    a memory storing instructions; and
    a processor executing the instructions to perform a process, the process including:
        receive a validated and processed data request from a consumer, the data request including a request for information about one or more data types of a plurality of data types;
        perform a context building process to generate context information for the data request from the consumer, the context building process including generating derived data requests for at least one data type different than the one or more data types included in the data request from the consumer based on a predicted trajectory and consumer parameters of the consumer;
        perform a generate list process to spatially resolve and generate a list of one or more producers from which data can be requested;
        perform a filter process to select one or more of the one or more producers that are capable of providing data relevant to the context information for the data request;
        transmit a producer data request to the selected producers based on the context information and the selected one or more of the one or more producers;
        receive, validate, and process data responses from the selected producers;
        generate data prediction information based on accumulated preserved data gathered for one or more prior data requests;
        perform a data fusion process to generate a consolidated data response for the consumer by combining at least the validated and processed data responses from the producers with the data prediction information; and
        transmit the consolidated data response to the consumer.

2. The system of claim 1, wherein the system is located in a ground center.

3. The system of claim 2, wherein the generate list process includes:
    access a repository of registered producers and registered consumers, and
    select from the registered producers one or more producers for the list of one or more producers from which data can be requested.

4. The system of claim 1, wherein, to transmit the producer data request, the process further includes create request tags and send the request tags to each of the selected producers through an asynchronous message channel.

5. The system of claim 1, wherein, to generate the data prediction information, the process further includes:
    retrieve forecast data from a repository of forecasted data.

6. The system of claim 5, wherein, to generate the consolidated data response, the process further includes:
    access a repository of data history and analytics that stores a history of data flow is related to, retrieve historical information associated with areas where real-time data is not available from requested producers, and add the historical information to the at least the validated and processed data responses from the producers with the data prediction information.

7. The system of claim 1, wherein the process further includes:
    determine a price of the consolidated data response for the consumer.

8. The system of claim 1, wherein the data request includes one or more items of information of:
    flight position coordinates, course, and phase information for the consumer;
    a request for real-time data;
    an emergency type parameter;
    an acceptable delay tolerance;
    a data trending request; or
    a predicted data request, and
    the context building process includes:
    when the validated and processed data request includes the request for real-time data:
        extracting geospatial boundaries from the data request comprising polygons that contain points represented by latitude, longitude, and altitude for the region of interest;
        determining the geospatial boundaries for the data request; and
        performing the generate list process based on information on the geospatial boundaries;
    when the data request includes the flight position coordinates:
        generating the predicted trajectory of the consumer based on a current position of the consumer and the consumer parameters;
        determining flight levels of the predicted trajectory based on the predicted trajectory;
        generating the derived data requests for the at least one data type based on the determined flight levels and the consumer parameters; and
        transmitting the data request and the derived data requests to the one or more of the one or more producers;
    when the data request includes the emergency type parameter:
        setting a priority for the data request; and
        processing the data request ahead of other data requests with a priority less than the priority of the data request;
    when the data request includes an acceptable delay tolerance:
        computing a refresh rate based on the delay tolerance; and
        processing and transmitting the data request based on the refresh rate;

when the data request includes a data trending request:
performing a data trending process, and transmitting a result of the data trending process with the consolidated data response; and when the data request includes a predicted data request: performing a data prediction process, and transmitting a result of the data prediction process with the consolidated data response.

9. The system of claim 1, wherein
the generate list process includes:
  obtaining a list of registered producers from a database;
  obtaining position reports for all the registered producers;
  extracting relevant values from the position reports, including values of latitude, longitude, and altitude of the registered producers;
  computing trajectories of the registered producers based on the position reports and vehicle parameters obtained from the database;
  obtaining geospatial boundaries of the data request;
  based on the computed trajectories of the registered producers, identifying a list of registered producers that are or likely to be within the geospatial boundaries as the list of the one or more producers; and
the filter process includes:
  obtaining a set of data types currently available for the list of the one or more producers from the database;
  matching the one or more data types of the data request with the data types currently available for the list of the one or more producers to determine which of the list of the one or more producers are available to be the one or more of the one or more producers; and
  filtering the available of the list of the one or more producers based on confidence levels to determine the one or more of the one or more producers.

10. The system of claim 1, wherein the system handles delays in making requests to and getting responses from the producers by using an asynchronous mode of data exchange with the consumer using asynchronous message channels, with the process sending asynchronous mode updates depending upon the geospatial nature of the data responses from the producers.

11. The system of claim 10, wherein if total time taken for a data response from the ground center to the consumer is less than or equal to a maximum allowed delay, then the data response from the ground center to the consumer is acceptable.

12. The system of claim 11, wherein the total time taken for a data response from the ground center to the consumer comprises:
  time taken for the data request to flow from the consumer to the ground center;
  time taken to locate the producers;
  time taken to filter the located producers;
  time taken to send requests to all filtered producers;
  time taken to receive and process responses from the producers;
  time taken for data fusion; and
  time required to send the data response to the consumer.

13. The system of claim 1, wherein the data fusion process includes:
  (a) obtain a geospatial region for the data request;
  (b) identify producers capable of providing a response to the data request;
  (c) obtain responses to the data requests from the identified producers within a stipulated iteration response time;
  (d) identify overlapping responses within the geospatial region;
  (e) identify the overlapping responses with respect to flight levels;
  (f) identify the overlapping responses with respect to confidence levels;
  (g) generate data interpolation based on the flight levels and the confidence levels;
  (h) convert each of the responses into a geospatial format;
  (i) format the responses in a grid format bounded by geospatial polygons;
  (j) generate a single data set of three-dimensional (3D) data fusion;
  (k) send the single data set of 3D data fusion to the consumer;
  (l) determine whether all identified producers have sent a response within the iteration response time; and
  (m) if all identified producers have not sent responses, repeat the data fusion process starting at step (c) until all identified producers have responded within a specified response expected time.

14. The system of claim 13, wherein, prior to generating the single data set of 3D data fusion, the data fusion process further includes:
  Identify one or more grids for which there is no real-time data available within the iteration response time; and
  obtain predicted data to fill the one or more grids for which no real-time data is available.

15. The system of claim 1, wherein the data fusion process includes:
  obtain geospatial polygon regions for a data trending request from the consumer;
  obtain a time interval for the data trending request;
  determine whether historical real-time data is available from producers;
  obtain partial or full historical real-time data from the producers when available;
  optionally obtain partial or full historical predicted data from a ground center;
  perform data fusion of the available historical real-time data and the historical predicted data when obtained;
  identify producers that provide current real-time data for the geospatial polygon regions;
  send data request tags to the identified producers;
  perform data fusion of current real-time data responses from the identified producers with the data fusion of the available historical real-time data and the historical predicted data when obtained;
  packing all historical and current real-time data into a fused data set; and
  sending the fused data set to the consumer.

16. The system of claim 15, wherein the data trending request comprises a weather data trending request.

17. A system for operating a mobile consumer application on an electronic user interface in a consumer vehicle, the system comprising:
  a memory storing instructions; and
  a processor executing the instructions to perform a process, the process including:
    obtain position and trajectory information for the consumer;
    display a position of the consumer overlaid as an icon along a flight path shown on the user interface based on the position and trajectory information for the consumer;
    display a mechanism on the user interface to select a particular geographical location for which aeronautical data is to be requested and receive a selection of a requested aeronautical data;

construct request tags corresponding to the requested aeronautical data;

transmit the request tags to a ground center and receive responses to the request tags from the ground center, the response including the requested aeronautical data and extended taps that contain messages indicating relevant additional information available;

validate the responses;

generate graphics for the user interface that correspond to the valid responses, the generated graphics including graphics for the requested aeronautical data and graphics for the messages indicating the relevant additional information is available;

display on the user interface the flight path of the consumer and the generated graphics; and transmit a response based on a user input associated the messages, the user input indicating whether a user requests the relevant additional information.

18. A system for operating an onboard sensor utility in a producer vehicle, the system comprising:

a memory storing instructions; and a processor executing the instructions to perform a process, the process including:

obtain position and trajectory information for the producer;

obtain real-time sensor data from one or more onboard sensors in the producer;

obtain a list of data types or products for which real-time sensor data is available from the one or more onboard sensors;

receive a data request from the ground center through an onboard communication manager and validate the data request; and send a sensor data request to the one or more onboard sensors in response to receiving and validating the data request; and generate and transmit a response based on the data request received by the producer, the response including:

the obtained position and trajectory information for the producer when the data request includes a request to identify a current position and trajectory, information based on the obtained list of data types or products when the data request includes a request for supported data types of the producer, and information associated with a specific data type of the obtained real-time sensor data when the data request includes a request for the specific data type.

19. The system of claim 18, wherein the one or more onboard sensors are integrated with the processor and are configured to:

process specific spatial queries based on the data request, and obtain specific spatial sensor data in the obtained real-time sensor data based on the specific spatial queries.

* * * * *